May 3, 1966 R. W. KING 3,249,660
METHOD AND APPARATUS FOR FORMING CONTAINERS FROM
EXPANDABLE PLASTIC MATERIALS
Filed March 1, 1963

INVENTOR.
ROBERT W. KING
BY
W. A. Schaich and C. N. White
ATTORNEYS

United States Patent Office 3,249,660
Patented May 3, 1966

3,249,660
METHOD AND APPARATUS FOR FORMING CONTAINERS FROM EXPANDABLE PLASTIC MATERIALS
Robert William King, Winthrop, Mass., assignor to Owens-Illinois Inc., a corporation of Ohio
Filed Mar. 1, 1963, Ser. No. 262,096
6 Claims. (Cl. 264—51)

This invention relates to an apparatus and method for forming hollow articles from expandable plastic foam materials. More particularly, this invention relates to a method and apparatus for an injection molding of expandable plastic materials to produce a hollow container having a cellular structure.

In recent years expandable plastic materials, such as expandable polystyrene, have gained widespread use as a molding material and various methods have been devised for molding the same. One of these methods contemplates the introduction of partially expanded plastic beads into a female mold cavity and thereafter applying heat to expand the beads while a male plug is forced into the mold cavity to give the desired shape to the finished article. However, it will be apparent that such a process involves several distinct steps plus the use of special equipment. For example, special pre-expansion apparatus is necessary for furnishing the partially expanded beads to the mold. In addition, difficulty is experienced in effecting a uniform distribution of the beads in the mold cavity which in turn affects the homogeneity of the cellular structure of the completed article.

Accordingly, it is an object of this invention to provide a new and improved method and apparatus for molding expandable plastic materials into articles having a more homogeneous cell structure and density.

A further object of this invention is to provide a method and apparatus for molding expandable plastic materials wherein the use of such auxiliary equipment as pre-expansion apparatus is avoided.

A still further object of this invention is to provide a method and apparatus molding expandable plastic materials into articles having a uniform cell structure wherein a closed automatic system is employed.

A further object of this invention is to provide a method and apparatus for forming hollow containers of uniform cell structure from expandable plastic materials by a controlled application of pressure to said plastic materials prior to their introduction into the mold cavity.

These and other objects and advantages will be apparent from the description which follows.

According to the present invention, a hollow container consisting of expanded plastic materials is made by a process comprising extruding an expandable plastic into a first chamber or accumulator, applying mechanical pressure by means of a plurality of pistons on said plastic to prevent its expansion, and thereafter transferring said plastic by said pistons to a mold cavity wherein controlled expansion and shaping of the plastic occurs to produce a container of uniform cellular structure.

The nature of the present invention will become more evident from the following detailed description thereof when read in conjunction with the accompanying drawings in which.

Figure 1:
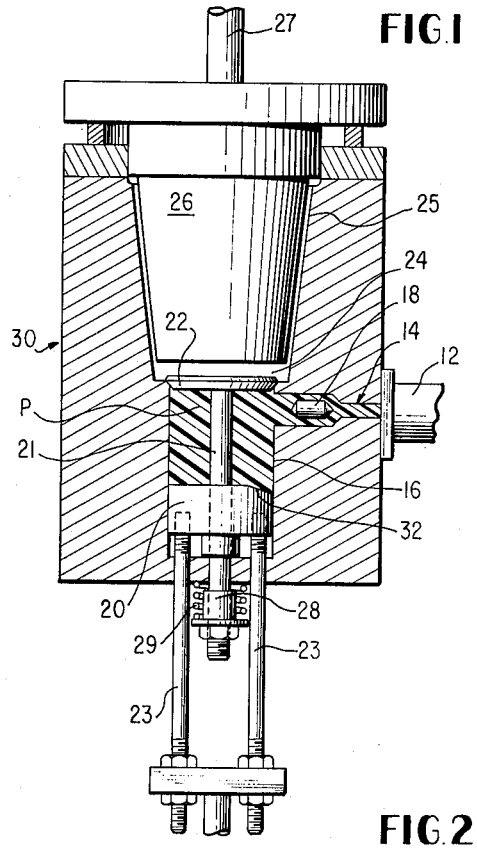
FIG. 1 is a sectional view of one apparatus embodiment of the invention showing the components thereof in the first position when the plastic material is being transferred from the extruder to the accumulator.
Figure 3:
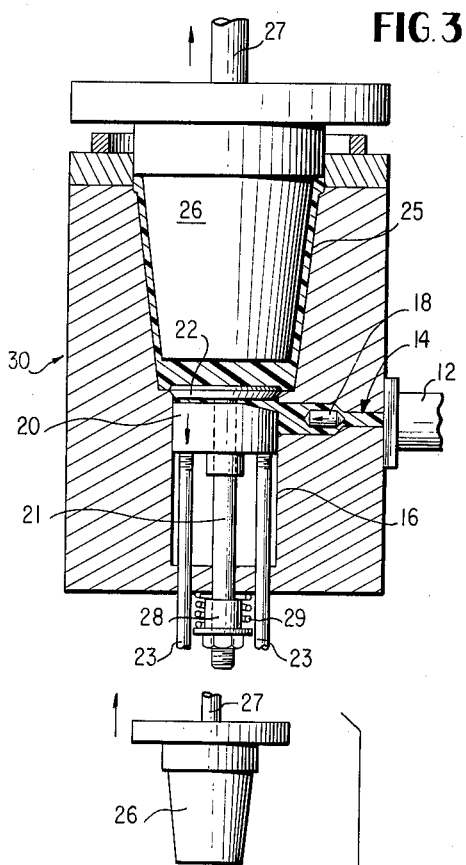
FIG. 3 is similar to FIGS. 1 and 2 but shows the mold components in their final position upon completion of the molded cellular article.
Figure 2:
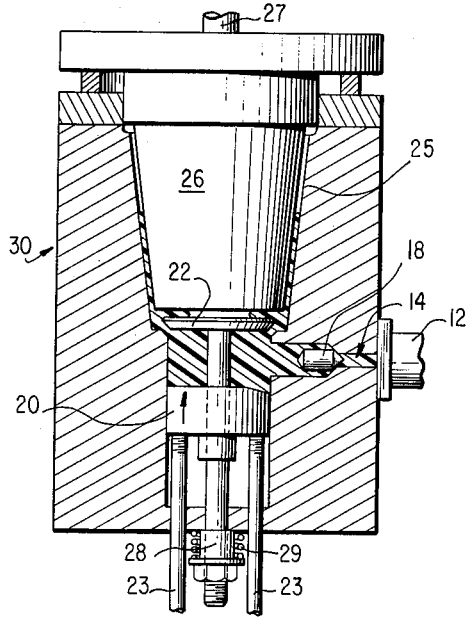
FIG. 2 is similar to FIG. 1 but shows the molding components in the second position wherein the plastic materials are being transferred from the accumulator to the mold cavity.
Figure 4:
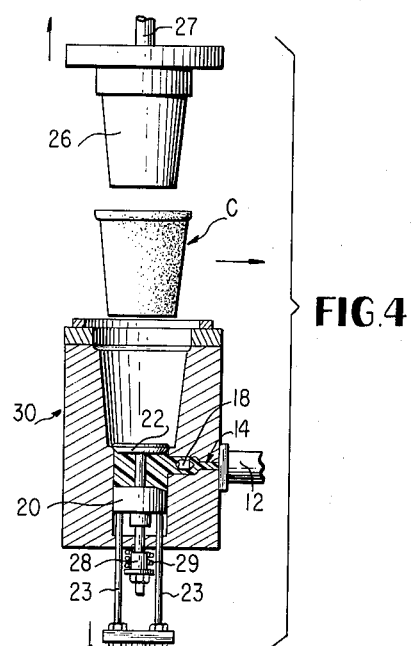
FIG. 4 is a sectional view of the apparatus wherein the mold plug is withdrawn and the finished article is removed preparatory to repeating the molding cycle.

The operation of the apparatus and the manner in which the process is carried out will be evident by referring particularly to FIGS. 1, 2 and 3. A given molding cycle as practiced by the present invention begins with the various parts in the position shown in FIG. 1 wherein a conventional extruder (not shown) with its associated injection nozzle 12 is connected to a channel 14 leading directly to a first chamber or accumulator 16. Within channel 14 is located a check valve 18 that controls the flow of heated expandable plastic material from injection nozzle 12. Positioned within accumulator 16 are two concentric rams or pistons 20 and 22, that is, pistons having a common center or axis of reciprocable movement, connected to piston rods 23 and 21, respectively. Piston 20 is actuated by power means (not shown). A stop 28 and spring 29 are provided on piston rod 21 to effect a further control thereof. The upper end of the accumulator 16 opens into a second chamber or mold cavity 24 which has mounted therein a reciprocable plug 26 reciprocated by power means (not shown). Wall 30 which is common to both the accumulator 16 and mold cavity 24 has openings (not shown) therein for the circulation of hot water or other heating means such as cartridge heaters. In addition, cooling units (not shown) can be provided in wall 30 and plug 26 for the circulation of cold water.

The method whereby the aforementioned apparatus is employed in the novel method of this invention is as follows: Expandable for foamable plastic material, such as polystyrene, is forced under pressure from the extruder to injection nozzle 12 into channel 14 past check valve 18 into the accumulator chamber 16. The pressure of this plastic, designated as P, forces piston 20 downward as shown in FIG. 1. Check valve 18 is in the forward position permitting pressure to be maintained on the plastic P in the accumulator by the extruder. Upon reaching its bottom position piston 20 is forced upward by piston rod 23. As a result, piston 22 moves upward due to the increased force of the plastic P overcoming the normal restraining force of spring 29 (FIG. 2).

Simultaneously check valve 18 shifts to block flow-back of plastic P into the injection nozzle 12. Piston 22 moves upward toward plug 26 until checked by stop 28 mounted on the piston rod 21. The plastic P is then forced under pressure around piston 22 and into the mold cavity 24 as shown in FIG. 2. FIG. 3 shows a further stage in the method wherein the mold cavity is completely filled with the plastic material P and being held under pressure by the piston 22, force plug 26, and wall 30. FIG. 2 can be designated as representing a first closed position while FIG. 3 represents a second closed position for mold cavity 24 which in each position has one common surface 25.

Thereafter, plug 26 by means of piston rod 27 connected to a source of power (not shown) is retracted to a specified distance to allow expansion of the material (FIG. 3). The amount of expansion and hence the density of the material can be controlled at this point by the distance that plug 26 is retracted. Of course, there is a maximum distance to which plug 26 could be retracted dictated by the maximum expansibility of the plastic material used. This expansion of the plastic P not only serves to define the contour of the container C or cup in sharp outline but to cool the cup due to the inherent cooling effect of the expanding polystyrene.

With the completion of the molding of the cellular container or cup, the hydraulic pressure on piston 20 is removed and both piston 20 and 22 are forced downward by the plastic pressure within the accumulator 16. As piston 20 moves downward, a cutaway cavity or recess 32 therein is exposed to the channel 14 connected to injection nozzle. This causes check valve 18 to shift due to the decrease in plastic pressure on the accumulator side of the check valve (FIG. 3). Piston 20 is thereby forced downward due to the pressure now being exerted on it by the plastic under high pressure from extruder (not shown) through channel 14.

During the descent of piston 20, plug 26 is completely retracted from the mold cavity, the finished container C mounted on the plug 26 is ejected by conventional means (not shown), and the plug 26 is returned to its first position ready for the next molding cycle. When ram 20 reaches its bottom-most position as shown in FIG. 1 the next cycle is ready to begin.

It will be apparent to those skilled in the art that various modifications can be made in the foregoing method. For example, a plurality of molds can be fed simultaneously or in sequence from extruder nozzle 12. Although the ejection means referred to above is not shown, it is evident that any of the well known ejector means such as compressed air connected to drilled openings in plug 26 can be employed. Moreover, to eliminate any possibility of expandable plastic material adhering to the plug or mold cavity walls, the surfaces thereof may be coated with any of the well known mold lubricants, such as silicone and Teflon resins.

In general, the foamable or expandable plastic material delivered from the extruder (not shown) through channel 14 is polystyrene which contains a volatile liquid, such as n-pentane as an expanding agent. However, polystyrene containing any of the well known volatile liquid expanding agents can be employed. Moreover, polystyrene containing one of the solid chemical expanding agents, which have been developed for this plastic can also be used. Although polystyrene is preferred, any plastic can be used which is capable of being extruded and further expanded in the manner described above. In general, the plastic as delivered from the extruder is at a temperature of about 250° F. and this temperature should be maintained by the heating units employed in the wall 30 and plug 26 during the molding cycle. Upon completion of the molding cycle, cold water can be circulated through the wall 30 and plug 26, an expedient well known in the art, to facilitate and expedite the setting up of the finished container C.

From the foregoing description it will be apparent that there has been devised a novel method and apparatus whereby molded containers, characterized by having a homogeneous cellular structure and density, can be made in a closed system from expandable or formable plastic material without resorting to the use of auxiliary apparatus such as pre-expansion equipment for preliminarily expanding foamable polystyrene beads prior to their introduction into the molding cavity.

A representative embodiment of the invention has been described above, but it is to be understood for illustrative purposes only and that the invention herein disclosed may take various other forms coming within the scope of the appended claims.

What is claimed is:

1. Method of injection molding a hollow container from expandable plastic materials comprising extruding an expandable plastic into a first chamber,
applying mechanical pressure by the cooperative action of two movable members one within said first chamber and one without said chamber on said plastic to prevent its expansion
thereafter transferring said plastic while maintaining the plastic under such pressure as to prevent expansion thereof by means of said pistons to a mold cavity comprising a pair of mold members having surfaces which form a first closed position, and
then moving the mold members to a second closed position for the mold cavity whereby the expansion and shaping of the plastic in the mold cavity takes place so as to produce a container of cellular structure.

2. Method of injection molding a hollow container from expandable plastic materials comprising extruding an expandable plastic into a first chamber,
applying mechanical pressure by the cooperative action of two movable pistons one within said first chamber and one without said chamber on said plastic to prevent its expansion
thereafter transferring said plastic while maintaining the plastic under such pressure as to prevent expansion thereof by means of said pistons to a mold cavity comprising a pair of mold members having surfaces which form a first closed position, and
then moving the mold members to a second closed position for the mold cavity whereby the expansion and shaping of the plastic in the mold cavity takes place so as to produce a container of cellular structure.

3. Apparatus for the injection molding of expandable plastic materials to produce a hollow container having a cellular structure comprising in combination an accumulator having an opening in its upper end adapted for closure by a wall-like member,
means for admitting a controlled amount of plastic materials to said accumultor,
a channel connecting said means with said accumulator,
means responsive to the pressure of said injected plastic materials to control the flow thereof,
a mold cavity,
a plurality of pistons for effecting a controlled delivery of plastic materials under pressure from said accumulator to said mold cavity so as to prevent premature expansion of said plastic materials comprising
a first piston positioned externally of said accumulator and at the upper end of said accumulator serving as the upper wall thereof when closed and regulating the flow of plastic materials from said accumulator to said cavity when opened,
a second piston reciprocably operable within said accumulator, and
a male plug adjustably positioned within said cavity to control the amount of expansion of plastic material theerin.

4. The apparatus of claim 3 in which a spring means is provided for restraining the first piston.

5. The apparatus of claim 3 in which a recess is provided in the upper portion of said second piston for the purpose of creating a differential pressure on the means in said channel so as to control the flow of plastic materials therethrough.

6. The apparatus of claim 4 wherein the two pistons of said accumulator are concentrically positioned.

References Cited by the Examiner

UNITED STATES PATENTS

| | | | |
|---|---|---|---|
| 2,505,540 | 4/1950 | Goldhard | 18—30 |
| 2,862,240 | 12/1958 | Strauss | 18—30 |
| 2,871,516 | 2/1959 | Sherman et al. | 18—30 |
| 2,887,716 | 5/1959 | Crosio | 18—30 XR |
| 2,950,501 | 8/1960 | Harkenrider | 18—30 |

(Other references on following page)

UNITED STATES PATENTS

| | | | |
|---|---|---|---|
| 2,951,260 | 9/1960 | Harrison et al. | 264—53 XR |
| 3,006,032 | 10/1961 | Baker et al. | 18—30 |
| 3,029,472 | 4/1962 | Fischer | 18—48 XR |
| 3,069,725 | 12/1962 | Root | 264—51 |
| 3,111,710 | 11/1963 | Plymale | 264—51 XR |
| 3,123,857 | 3/1964 | Wacker | 264—51 XR |
| 3,145,240 | 8/1964 | Proulx et al. | 264—53 |
| 3,162,704 | 12/1964 | Attanasio et al. | 264—53 |
| 3,167,811 | 2/1965 | Kraus et al. | 264—53 XR |

OTHER REFERENCES

Modern Plastics, "New Techniques for Processing Expandable Styrene Foam: Injecting Molding," Sept. 1960, pp. 113, 115 and 202.

Plastics World, "Injection Molding Expandable Polystyrene Beads," Jan. 1962, pp. 18 ff.

ALEXANDER H. BRODMERKEL, *Primary Examiner.*

P. E. ANDERSON, *Assistant Examiner.*